United States Patent

Hadano et al.

[11] Patent Number: 5,887,859
[45] Date of Patent: Mar. 30, 1999

[54] SUSPENSION BUSHING

[75] Inventors: Katsuya Hadano, Kasugai; Tetsuya Tsuiki, Haguri-gun, both of Japan

[73] Assignee: Toyoda Gosei Co., Ltd., Aichi-ken, Japan

[21] Appl. No.: 726,491

[22] Filed: Oct. 7, 1996

[30] Foreign Application Priority Data

| Oct. 5, 1995 | [JP] | Japan | 7-286708 |
| Oct. 5, 1995 | [JP] | Japan | 7-286709 |
| Oct. 5, 1995 | [JP] | Japan | 7-286710 |
| Jan. 25, 1996 | [JP] | Japan | 8-032650 |

[51] Int. Cl.$^6$ .................................................. F16F 5/00
[52] U.S. Cl. ........................................................ 267/141.1
[58] Field of Search ........................... 267/141.1, 141.5, 267/141, 153, 154, 258, 270, 276, 279, 281; 29/447, 897.2, 898.055, 898.054, 898.15; 384/125, 215, 276, 282, 285, 297

[56] References Cited

U.S. PATENT DOCUMENTS

| 5,080,334 | 1/1992 | Mihara | 267/141.1 |
| 5,221,077 | 6/1993 | Woguchi | 267/141.1 |
| 5,540,420 | 7/1996 | Luzsicza | 267/141.1 |

FOREIGN PATENT DOCUMENTS 64-30937  2/1989  Japan .

*Primary Examiner*—Robert J. Oberleitner
*Assistant Examiner*—C. T. Bartz
*Attorney, Agent, or Firm*—Cushman Darby & Cushman, IP Group of Pillsbury Madison & Sutro LLP

[57] ABSTRACT

An entire outer periphery of an axially central portion of an inner cylindrical member is expanded outwardly to define an expanding portion having a spherical configuration of which a center locates about an axial line of the inner cylindrical member. A cylindrical internal ring is disposed in about the middle between an outer cylindrical member and the inner cylindrical member coaxially and an axially central portion of the internal ring bends in conformity with the expanding portion of the inner cylindrical member. By virtue of the expanding portion and internal ring, the rigidity in the directions perpendicular to the axial direction increases. A first vibration-damping rubber member and a second vibration-damping rubber member are formed between the internal ring and the inner cylindrical member and between the internal ring and the outer cylindrical member, respectively, and annular recesses are formed in both axial end portions of the first and second vibration-damping rubber member, respectively, such that an inner end of each annular recess locates inwardly of an end edge of the expanding portion, thus decreasing the torsional rigidity.

18 Claims, 13 Drawing Sheets

SUSPENSION BUSHING

BACKGROUND OF THE INVENTION

1. Field of the Invention

The present invention relates to a suspension bushing adapted to be used in a suspension system of a motor vehicle.

2. Description of Related Art

To prevent the transmission of vibrations in a suspension system of a motor vehicle, suspension bushings have been mounted in coupling portions between a vehicle body and a suspension arm. The suspension bushing generally has an arrangement that, as shown in FIG. 1, an inner cylindrical member 10 and an outer cylindrical member 12 are disposed coaxially, and a vibration-damping rubber member 14 is interposed between the inner and outer cylindrical members 10 and 12.

To improve the stability and controllability of a motor vehicle, it is preferable to increase the rigidity of the suspension bushing in the directions perpendicular to the axial direction (in the directions of arrows a in FIG. 1), and to ensure an improved ride of a motor vehicle, it is preferable to reduce the rigidity thereof in the torsional directions (in the directions of arrows b).

Japanese patent application laid-open No. Sho 64-30937, for example, discloses a suspension bushing, as shown in FIG. 1, of which the inner cylindrical member 10 includes an expanding portion 16 having a spherical configuration in an axially central portion thereof. With this arrangement, the thickness of the axially central portion of the vibration-damping rubber member 14 decreases to increase the rigidity in the directions perpendicular to the axial direction thereof, whereas the thickness of the left and right portions of the vibration-damping rubber member 14 do not decrease, thus ensuring reduction of the rigidity in the torsional directions to a relatively small level.

Recently, further improvement of the stability and controllability has been required. The above arrangement, however, could not satisfy this requirement.

The inner clindrical member has been generally prepared by forging or press forming. However, when the expanding portion is required to have a great height, for example, the expanding portion is difficult to form integrally with the inner cylindrical member. To overcome this problem, Japanese utility model application laid-open No. Hei 6-76729, for example, has proposed another suspension bushing, as shown in FIG. 2, of which an inner cylindrical member 18 has a depression 22 along an outer periphery of the axially central portion thereof. A cylindrical resin member 24 of which an outer periphery expands outwardly into a generally spherical configuration is press-fitted in the depression 22 to define an expanding portion. A vibration-damping rubber member 26 is interposed between an outer cylindrical member 20 and the inner cylindrical member 18 including the expanding portion.

This conventional arrangement, however, has a problem that the thickness of the inner cylindrical member 18 decreases partly due to the provision of the depression 22, thus reducing buckling strength of the inner cylindrical member 18. Furthermore, the cylindrical resin member 24 having a nonuniform thickness is difficult to form, because of shrinkage occurring during the molding operation, or the like. In addition, when the expanding portion is too high, it may receive a large load to cause falling-off or cracking thereof.

SUMMARY OF THE INVENTION

It is an object of the present invention to provide a suspension bushing which has increased rigidity in the directions perpendicular to the axial direction thereof to ensure improvement of the stability and controllability of a vehicle, and which also has reduced rigidity in torsional directions thereof to ensure an improved ride of the vehicle.

It is another object of the present invention to provide a suspension bushing which has increased strength in the axial direction of an inner cylindrical member, of which a resin part is capable of being readily molded with an improved configuration accuracy and being prevented from falling-off and cracking due to the reception of a large load.

With a first aspect of the suspension bushing in accordance with the present invention, an inner cylindrical member and an outer cylindrical member are disposed coaxially, and a vibration-damping rubber member is interposed between and joined to the inner and outer cylindrical members. The inner cylindrical member has an expanding portion which expands outwardly from an entire outer periphery of an axially central portion thereof into a generally spherical configuration of which a center locates about the axial line of the inner cylindrical member.

An internal ring is disposed in about the middle between the inner cylindrical member and outer cylindrical member. An axially central portion of the internal ring bends in conformity with the expanding portion. A first vibration-damping rubber member is interposed between and joined to the internal ring and the inner cylindrical member, and a second vibration-damping rubber member is interposed between and joined to the internal ring and the outer cylindrical member. An annular recess is formed in each of axial end portions of the first and second vibration-damping rubber members, respectively, such that an inner end thereof locates inwardly of each end edge of the expanding portion.

The axially central portion of the outer cylindrical member may have a bending portion conforming with the expanding portion of the inner cylindrical member. With this arrangement, the rigidity in the directions perpendicular to the axial direction is further improved.

With a second aspect of the suspension bushing in accordance with the present invention, a vibration-damping rubber member is joined to an outer periphery of a cylindrical member having an expanding portion in the axially central portion thereof. An internal ring is embedded in the vibration-damping rubber member in about the middle thereof. The axially central portion of the internal ring bends in conformity with the expanding portion of the cylindrical member. An annular recess is formed in each of axial end portions of the vibration-damping rubber member between the internal ring and the cylindrical member such that an inner end thereof locates inwardly of each end edge of the expanding portion. A pair of flanges project radially outwardly from both axial ends of the vibration-damping rubber member. A bracket connected to a vibrating body is press-fitted unto an outer periphery of the vibration-damping rubber member between these flanges.

The internal ring has at least one annular reinforcing portion which extends radially outwardly from at least one end thereof. With the arrangement that the annular reinforcing portion is embedded in at least one of the above flanges on a vibration input side, for example, the rigidity of the flange is improved and falling-off of the suspension bushing can be prevented.

With a third aspect of the suspension bushing in accordance with the present invention, an inner cylindrical member and an outer cylindrical member are disposed coaxially, and a vibration-damping rubber member is interposed between and joined to the inner and outer cylindrical members. The inner cylindrical member has an expanding portion which expands outwardly from an entire outer periphery of an axially central portion thereof into a generally spherical configuration of which a center locates on or about the axial line of the inner cylindrical member.

The outer cylindrical member has at its axial central portion a bending portion which conforms with the expanding portion. The bending portion includes at its axial center a larger-diameter part having a uniform larger diameter. The larger-diameter part abuts an inner surface of a cylindricl bracket provided outside the outer cylindrical member. An annular recess is formed in each of axial end portions of the vibration-damping rubber member such that an inner end thereof locates inwardly of each end edge of the expanding portion.

The bending portion of the outer cylindrical member is connected to the axial ends thereof in a curved surface, respectively. Axial end portions of the vibration-damping rubber member, which define the annular recesses, may be formed thick on the side of the inner cylindrical member or outer cylindrical member as stopper means.

With a method in accordance with the present invention, which is adapted to produce a suspension bushing including an inner cylindrical member having an expanding portion with a generally spherical configuration, an outer cylindrical member disposed coaxially outside the inner cylindrical member and having a bending portion conforming with the expanding portion of the inner cylindrical member, and a vibration-damping rubber member joined to the inner and outer cylindrical members and having annular recesses in both axial end portions thereof, first, the outer cylindrical member is formed to have a larger-diameter part of a uniform larger diameter, which is adapted to face a top of the expanding portion of the inner cylindrical member, and side parts extending from both axial ends of the larger-diameter part such that the diameter thereof gradually decreases to both axial ends thereof with an inclination angle smaller than that of finished side parts, next, a vibration-damping rubber member having annular recesses in both aixal end portions thereof is joined to the inner and outer cylindrical members such that the thickness between the axially end portions and the inner cylindrical member is greater than a predetermined finished thickness, and then, the side parts of the outer cylindrical member are deformed into the predetermined finished configuration to reduce the thickness of the vibration-damping rubber member to the finished thickness. Preferably, the diameter of the entire outer cylindrical member may be reduced uniformly prior to the deforming of the side parts into the finished configuration.

With this method, since the initial inclination angle of the side parts of the outer cylindrical member is smaller than the finished inclination angle, the thickness of the axial end portions of the vibration-damping rubber member, which are defined by the side parts of the outer cylindrical member and the inner cylindrical member, is greater than the finished thickness. With this arrangement, when the side parts thus inclined are deformed and the vibration-damping rubber member is compressed into the finished thickness, strain generated in the vibration-damping rubber member can be reduced, thus improving the durability thereof. In addition, the annular recesses formed in the both axial end portions of the vibration-damping rubber member facilitate the deformation of the side parts of the outer cylindrical member. Furthermore, as compared to the conventional arrangement, annular recesses of large sizes can be provided, thus ensuring distribution of stress, and accordingly, improvement of the durability of the bushing.

By reducing the diameter of the outer cylindrical member entirely to eliminate tension stress generated due to molding, and further reducing the diameter of only the side parts, the vibration damping rubber member can be held sufficiently, and accordingly the spring characteristic in the directions perpendicular to the axial direction can be greatly improved.

With a fourth aspect of the suspension bushing in accordance with the present invention, an inner cylindrical member and an outer cylindrical member are disposed coaxially, and a vibration-damping rubber member is interposed between and joined to the inner and outer cylindrical members. The inner cylindrical member has a convex portion which expands outwardly from an outer periphery of an axially central portion thereof in conformity with the configuration of a desired expanding portion into a height smaller than that of the desired expanding portion. A cover member is formed so as to cover the entire surface of the convex portion with a uniform thickness.

A large number of slight irregularities or grooves, or a plurality of slits or through-holes may be formed in a surface of the convex portion of the inner cylindrical member. This enables improvement of adhesion and moldability of the cover member.

Other objects, features, and characteristics of the invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Hereinafter, the suspension bushing of the present invention will be explained with reference to the accompanying drawings.

Figure 3:
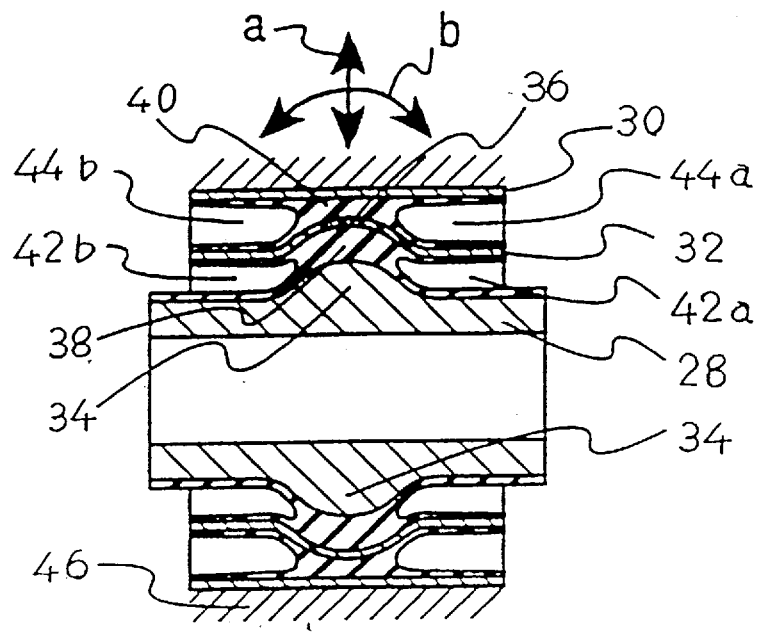
FIG. 3 is a longitudinal sectional view of a first embodiment of a suspension bushing in accordance with the present invention.

FIG. 3 illustrates a first embodiment of a suspension bushing in accordance with the present invention. As shown, a metallic inner cylindrical member 28 is disposed coaxially inside a metallic outer cylindrical member 30. A metallic internal ring 32 is disposed coaxially between the inner cylindrical member 28 and outer cylindrical member 30 in about the middle therebetween.

The inner cylindrical member 28 has an expanding portion 34 which expands outwardly from an entire outer periphery of an axially central portion thereof into a generally spherical configuration such that a center thereof locates on the axial line of the inner cylindrical portion 28.

A cylindrical internal ring 32 disposed outside the inner cylindrical member 28 curves in its entire outer periphery of an axially central portion 36 into a generally spherical configuration in conformity with the outer periphery of the expanding portion 34.

It is preferable that both the expanding portion 34 and internal ring 32 have spherical configurations, of which centers both locate on the axial line of the inner cylindrical member 28. Alternatively, they may locate about the axial line of the inner cylindrical member 28. The configuration of the expanding portion 34 and internal ring 32 is not limited to the spherical configuration. Generally spherical configuration such as a partly flattened spherical configuration will do.

A first vibration-damping rubber member 38 is formed between the inner cylindrical member 28 and the internal ring 32 by vulcanization, and a second vibration-damping rubber member 40 is formed between the internal ring 32 and the outer cylindrical member 30 by vulcanization. Normally, after vulcanizing the vibration-damping rubber members 38 and 40, the diameter of the outer cylindrical member 30 is reduced to eliminate strain of the vibration-damping rubber members 38 and 40 due to molding. With the present embodiment, to reduce the diameter of the internal ring 32 simultaneously, at least one axially extending slit is provided in the internal ring 32.

When the internal ring 32 locates in the middle between the inner cylindrical member 28 and outer cylindrical member 30, the resulting rigidity is the maximum. The internal ring 32 may be shifted in accordance with a desired spring characteristic.

Annular recesses 42a and 42b are formed in both axial end portions of the first vibration-damping rubber member 38. Inner ends of the annular recesses 42a and 42b locate inwardly of end edges of the expanding portion 34, respectively.

Annular recesses 44a and 44b are also formed in both axial end portions of the second vibration-damping rubber member 40. Inner ends of the annular recesses 44a and 44b also locate inwardly of the end edges of the expanding portion 34, respectively.

The suspension bushing thus arranged is mounted on a vehicle by inserting an axial member (not shown) connected to a vehicle body into the inner cylindrical member 28, and press-fitting the outer cylindrical member 30 in a bracket 46 connected to a suspension arm (not shown). The rigidity of the suspension bushing mounted greatly increases in the directions perpendicular to the axial direction (in the directions shown by the arrows a in FIG. 3) by virtue of the expanding portion 34 of the inner cylindrical member 28 and the internal ring 32, thus improving the stability and controllability.

The rigidity of the suspension bushing mounted is prevented from increasing in the torsional directions (in the directions shown by the arrows b of FIG. 3) due to the internal ring 32, because the axially central portion 36 of the internal ring 32 curves in conformity with the expanding portion 34 of the inner cylindrical member 23. By virtue of the annular recesses 42a, 42b, 44a and 44b formed in both end portions of the vibration-damping rubber members 38 and 40 such that inner ends thereof locate inwardly of end edges of the expanding portion 34, the vibration-damping rubber members 38 and 40 generate shear deformation, but the compression deformation thereof is very small. This results in the rigidity in the torsional directions greatly decreasing, thus ensuring an improved ride of a vehicle.

Figure 4:
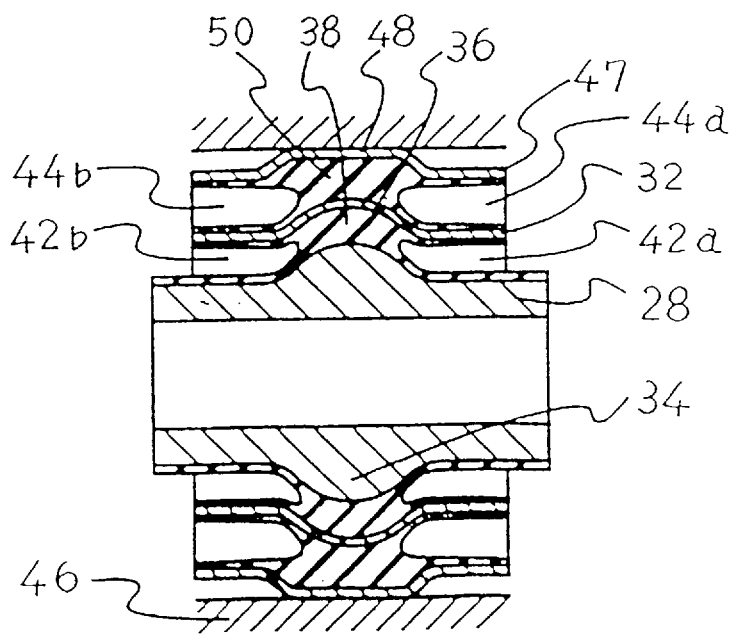
FIG. 4 is a longitudinal sectional view of a second embodiment of a suspension bushing in accordance with the present invention.

FIG. 4 illustrates a second embodiment of the present invention. As shown, an outer cylindrical member 47 has in its axially central portion a bending portion 48 which substantially conforms with the outer periphery of the expanding portion 34. To ensure a wide contacting area with a bracket 46, the cross-section of the bending portion 48 is formed into a generally trapezoidal configuration, thus preventing falling-off of the bushing relative to the bracket 46.

With this arrangement, the bending portion 48 of the outer cylindrical member 47 embraces the vibration-damping rubber member 50 to limit the displacement thereof in the axial direction. Thus, the rigidity in the directions perpendicular to the axial direction is further improved, and accordingly, the stability and controllability can be further improved, too.

Figure 5:
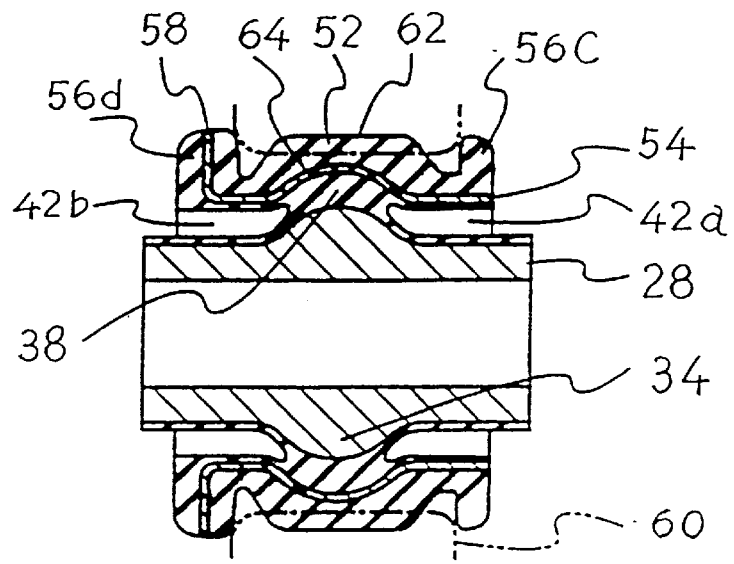
FIG. 5 is a longitudinal sectional view of a third embodiment of a suspension bushing in accordance with the present invention.

FIG. 5 illustrates a third embodiment of the present invention. As shown, in place of the outer cylindrical member provided in the preceding embodiments, a vibration-damping rubber member 52 having a predetermined thickness is formed outside the internal ring 54. Flanges 56c and 56d project outwardly from both axial ends of the vibration-damping rubber member 52. The internal ring 54 curves in a central portion 64 like the preceding embodiments and has a brim-like portion 58 which projects radially outwardly from one end thereof. The brim-like portion 58 is embedded in the flange 56d on the vibration-input side (left side in FIG. 5), to increase the rigidity of the flange 56d. A vibration-damping rubber member 38 interposed between and joined to the inner cylindrical member 38 and the internal ring 54, has annular recesses 42a and 42b. A cylindrical bracket 60 has an inner diameter slightly less than the outer diameter of an axially central portion of the vibration-damping rubber member 52, which is defined between the flanges 56c and 56d. The bracket 60 thus sized is press-fitted onto an outer periphery of the axially central portion of the vibration-damping rubber member 52. This results in the vibration-damping rubber members 38 and 52 being compressed so that the outer periphery of the axially central portion of the vibration-damping rubber member 52 abuts the inner periphery of the bracket 60, to ensure close adhesion to the bracket 60.

With this arrangement, operational advantages similar to those of the preceding embodiments can be obtained. Furthermore, no outer cylindrical member is needed, thus reducing the number of necessary parts, and accordingly, reducing the production costs. Since the flanges 56c and 56d act as stopper means, and the brim-like portion 58 is embedded in the flange 56d on the vibration input side of the vibration-damping rubber member 52, the rigidity of the bushing is improved to prevent falling-off thereof.

Figure 6:
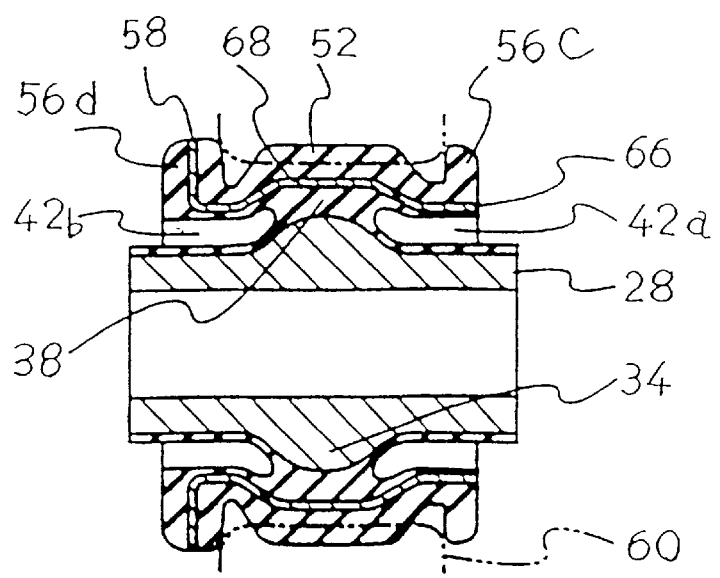
FIG. 6 is a longitudinal sectional view of a fourth embodiment of a suspension bushing in accordance with the present invention.

FIG. 6 illustrates a fourth embodiment of the present invention. Upon press-fitting the bushing having no outer cylindrical member, as shown in FIG. 5, in a bracket 60, stress may concentrate on a top of a curved part 64 of the internal ring 54 to decrease the durability and generate falling-off of the bushing. With the arrangement of the fourth embodiment, a central portion 68 of an internal ring 66 is formed into a trapezoidal cross-section. The remainder of the structure of the suspension bushing of the fourth embodiment is identical to that of the third embodiment shown in FIG. 5.

With this arrangement, stress applied to the central portion 68 of the internal ring 66 can be distributed, thus ensuring improvement of both the durability and falling-off resistance of the bushing.

Figure 7:
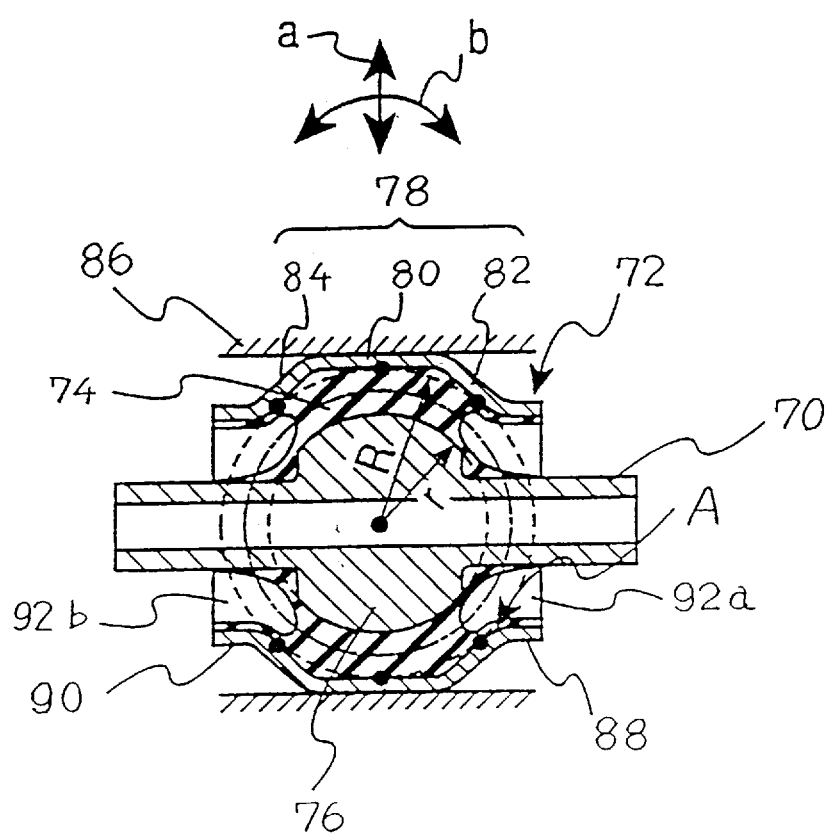
FIG. 7 is a longitudinal sectional view of a fifth embodiment of a suspension bushing in accordance with the present invention.

FIG. 7 illustrates a fifth embodiment of a suspension bushing of the present invention. As shown, a metallic inner cylindrical member 70 is disposed coaxially inside a metallic outer cylindrical member 72. A ring-like vibration-damping rubber member 74 having a uniform thickness is interposed between and joined to the inner cylindrical member 70 and the outer cylindrical member 72.

The axially central portion of the inner cylindrical member 70 expands radially outwardly to define an expanding portion 76 having a generally spherical configuration (radius r) of which a center locates on the axial line of the inner cylindrical member 70.

It is preferable that the expanding portion 76 has a spherical configuration of which a center locates on the axial line of the inner cylindrical member 70. Alternatively, the center of the spherical expanding portion may deviate slightly from the axial line. In addition, any configuration approximating the spherical configuration will do. For example, the expanding portion 76 may have a flat surface or a combination of flat surfaces.

The outer cylindrical member 72 has a bending portion 78 in its axially central portion, which bends in conformity with the expanding portion 76 of the inner cylindrical member 70. The bending portion 78 has a generally trapezoidal cross-section, and includes a larger-diameter part 80 at its axial central portion and inclined side parts 82 and 84. The larger-diameter part 80 has a uniform larger diameter and is adapted to abut an inner surface of a cylindrical bracket 86 disposed outside the outer cylindrical member 72. The side parts 82 and 84 of the bending portion 78 are respectively connected to both axial ends 88 and 90 of the outer cylindrical member 72 in a curved surface, respectively, as shown by arrow A in FIG. 7.

The bending portion 78 is formed such that the larger-diameter part 80 and side parts 82 and 84 contact the sphere with radius R, of which the center locates on the axial line of the outer cylindrical member 72, at points shown by symbols ● in FIG. 7, respectively. It is preferable to form the bending portion 78 into a generally spherical configuration of which the center locates on or about the axial line of the outer cylindrical member 72.

The vibration-damping rubber member 74 interposed between the inner cylindrical member 70 and the outer cylindrical member 72 has annular recesses 92a and 92b in both axial end portions thereof, which extend inwardly in the middle of the vibration-damping rubber member 74 (shown by an alternate long and short dash line in FIG. 7) such that inner ends thereof locate inwardly of end edges of the expanding portion 76.

Upon mounting the suspension bushing thus arranged on a vehicle, an axial member connected to a vehicle body is inserted into the inner cylindrical member 70, and the outer cylindrical member 72 is press-fitted in a bracket 86. The inclined side parts 82 and 84 of the bending portion 78 hold the vibration-damping rubber member 74 to limit the displacement of rubber in the axial direction, which enables great improvement of the rigidity in the directions perpendicular to the axial direction (in the directions shown by the arrows a in FIG. 7), and accordingly, enables improvement of the stability and controllability of a vehicle.

By virtue of the annular recesses 92a and 92b formed in both axial end portions of the vibration-damping rubber member 74 such that inner ends locate inwardly of end edges of the expanding portion 76, the vibration-damping rubber member 74 deforms smoothly along an outer periphery of the expanding portion 76 of the inner cylindrical member 70.

The deformation of the vibration-damping rubber member 74 is mainly shear deformation, and the compression deformation thereof is very small so that the rigidity in the torsional directions (in the directions shown by the arrows b in FIG. 7) greatly decreases to ensure an improved ride of a vehicle.

Since the bending portion 78 of the outer cylindrical member 72 is connected to the axial ends 88 and 90 in a curved surface, respectively, stress applied in the axial direction or the directions perpendicular to the axial direction is prevented from concentrating therebetween (point A in FIG. 7, for example). Thus, cracks or the like do not occur therein, and the durability of the outer cylindrical member 72 is improved. Furthermore, the outer cylindrical member 72 with a relatively simple configuration can be formed at low production costs, and the press-fitting properties of the outer cylindrical member 72 in the bracket 86 are also improved.

Figure 8:
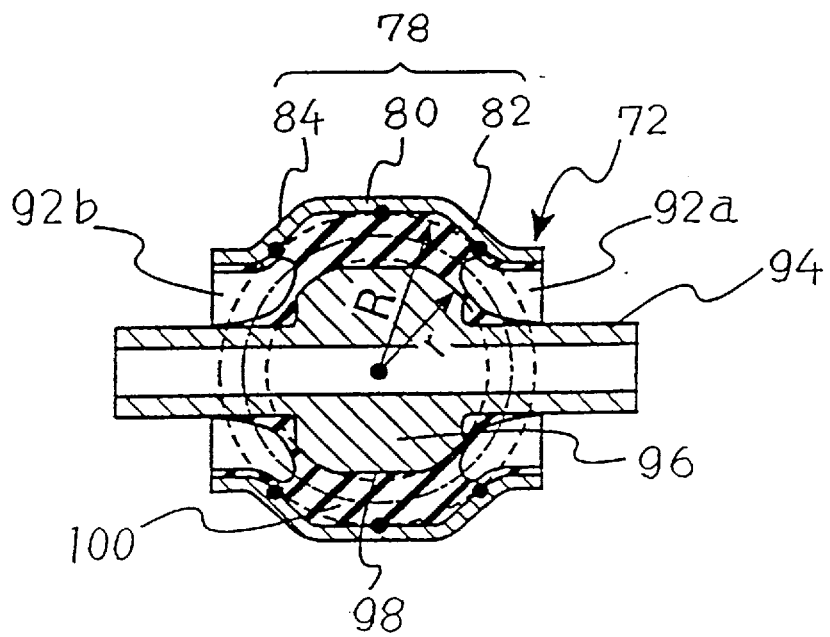
FIG. 8 is a longitudinal sectional view of a sixth embodiment of a suspension bushing in accordance with the present invention.

FIG. 8 illustrates a sixth embodiment of the present invention, in which the expanding portion has another configuration. As shown, an inner cylindrical member 94 has an expanding portion 96 of which an axially central part 98 defines not a spherical surface but a flat surface along an entire periphery thereof, which is parallel to a larger diameter part 80 of the outer cylindrical member 72. In the arrangement shown in FIG. 7, when a compression force is applied in the directions perpendicular to the axial direction, stress may concentrate on poles of the sphere as the expanding portion 76. In contrast, with the arrangement of this embodiment, by virtue of the flat central part 98, stress is distributed to improve the durability further. The remainder of the structure of the present embodiment is identical to that of the embodiment shown in FIG. 7, and accordingly, explanations thereof will be omitted.

Figure 9:
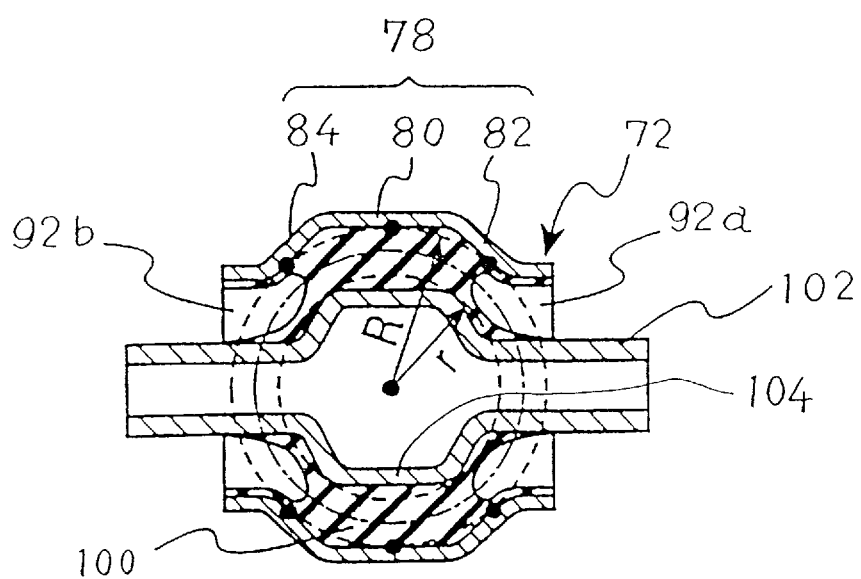
FIG. 9 is a longitudinal sectional view of a seventh embodiment of a suspension bushing in accordance with the present invention.

FIG. 9 illustrates a seventh embodiment of the present invention, in which an inner cylindrical member 102 is composed of a metallic sheet, and an expanding portion 104 is formed by press-forming. The expanding portion 104 has a generally trapezoidal cross-section which is inscribed in a sphere of a radius r. The remainder of the structure of this embodiment is identical to that of the embodiment shown in FIG. 7, and accordingly, explanations thereof will be omitted. With this arrangement, desired characteristics can be obtained easily with a simple configuration.

Figure 10:
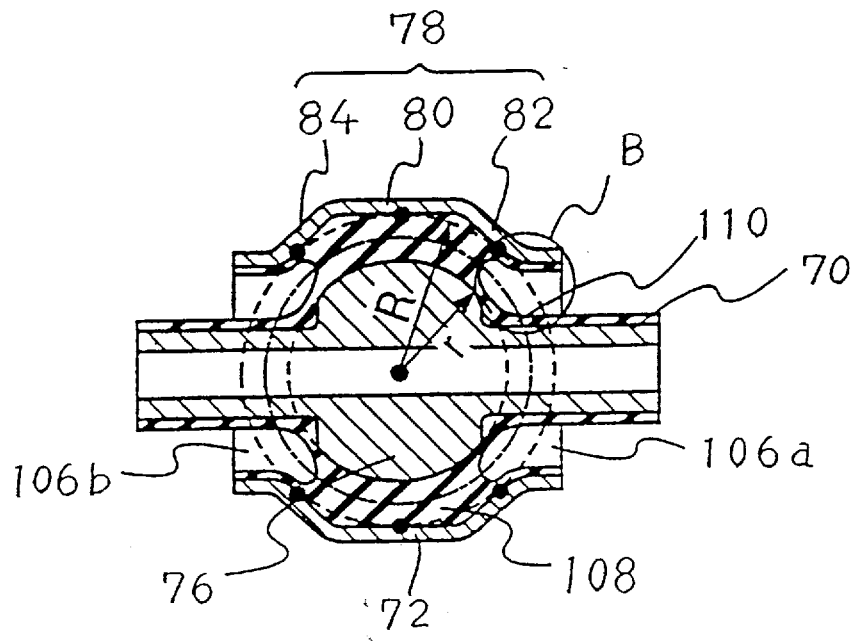
FIG. 10 is a longitudinal sectional view of an eighth embodiment of a suspension bushing in accordance with the present invention.
Figures 11, 12:
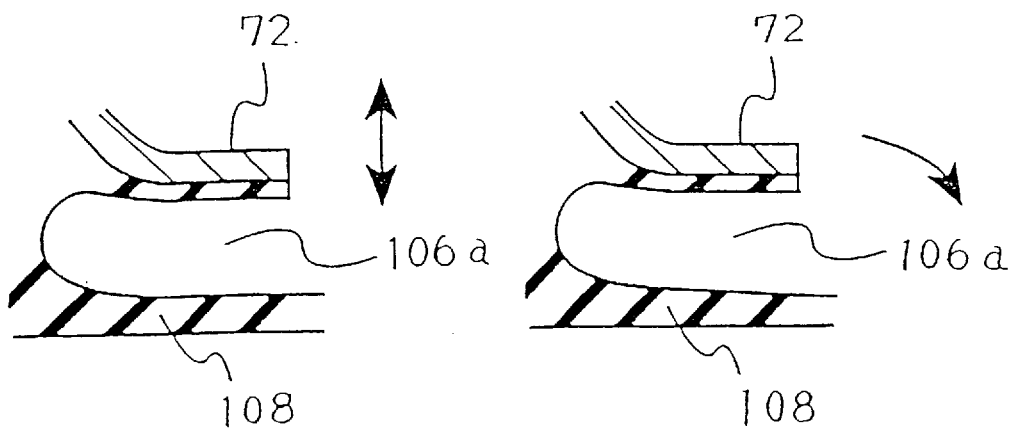
FIG. 11 is a view illustrating one example of a stopper, which is an enlarged view of a B part of FIG. 10.
FIG. 12 is a view illustrating another example of a stopper.

FIG. 10 illustrates an eighth embodiment of the present invention. As shown, a vibration-damping rubber member 108 define annular recesses 106a and 106b. Axially end portions of the vibration-damping rubber member 108, which define these recesses on the side of the inner cylindrical member 70, is formed thick (1 mm or more ) to define stoppers 110 which are adapted to relieve the shock caused by the abutment of the inner and outer cylindrical members 70 and 72 due to input of large-scaled vibrations. The vibration-damping rubber member 108 defining the stoppers 110 extends in the axial direction so as to cover an entire surface of the inner cylindrical member 70.

Where the stress applied in the directions perpendicular to the axial direction is large, it is preferable to form the stoppers 110 of the vibration-damping rubber member 108 into a uniform thickness, as shown in FIG. 11, and where the stress in the torsional directions is large, it is preferable to incline the stoppers 110, as shown in FIG. 12. With these arrangements, the resulting bushings are capable of enduring even a large load. The stoppers 110 may be provided on any side of the inner cylindrical member and outer cylindrical member.

Figure 13:
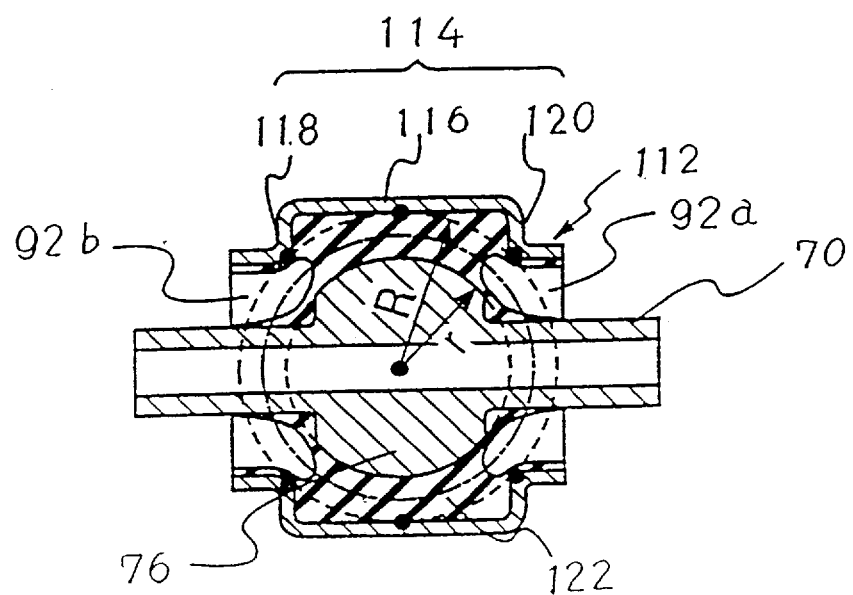
FIG. 13 is a longitudinal sectional view of a ninth embodiment of a suspension bushing in accordance with the present invention.

FIG. 13 illustrates an eighth embodiment of the present invention. As shown, a bending portion 114 of an outer cylindrical member 112 does not have a generally trapezoidal cross-section. An axial length of a larger diameter part 116 is made large, and side parts 118 and 120 are formed approximately perpendicularly to the larger diameter part 116. The bending portion 114 thus constructed contacts the sphere with radius R. By virtue of the larger diameter part 116 with a larger axial length, the contacting area between the outer cylindrical member 112 and an outside bracket increases to enable improvement of the falling-off resistance.

The suspension bushing of which an outer cylindrical member has a bending portion, as shown in FIG. 7, is produced by first forming the inclined side parts 82 and 84 of the bending portion 78 of the outer cylindrical member 72 with an initial inclination angle (FIG. 14) which is smaller than a finished inclination angle (FIG. 15), and performing a normal surface treatment on the outer cylindrical member 72 and an inner cylindrical member 70. After applying an adhesive agent and drying the same, the outer cylindrical member 72 is disposed coaxially outside the inner cylindrical member 70, and a vibration-damping rubber member 74 is formed between the inner cylindrical member 70 and outer cylindrical member 72 by injection molding. This enables the thickness a of the vibration-damping rubber member 74 between the inclined side parts 82 and 84 of the outer cylindrical member 72 and the inner cylindrical member 70 to be formed greater than the finished thickness (a' in FIG. 15). It is preferable that the thickness a of the vibration-damping rubber member 74 is equal or greater than the thickness b of the vibration-damping rubber member 74 between the larger-diameter part 80 and the inner cylindrical member 70.

Figure 14:
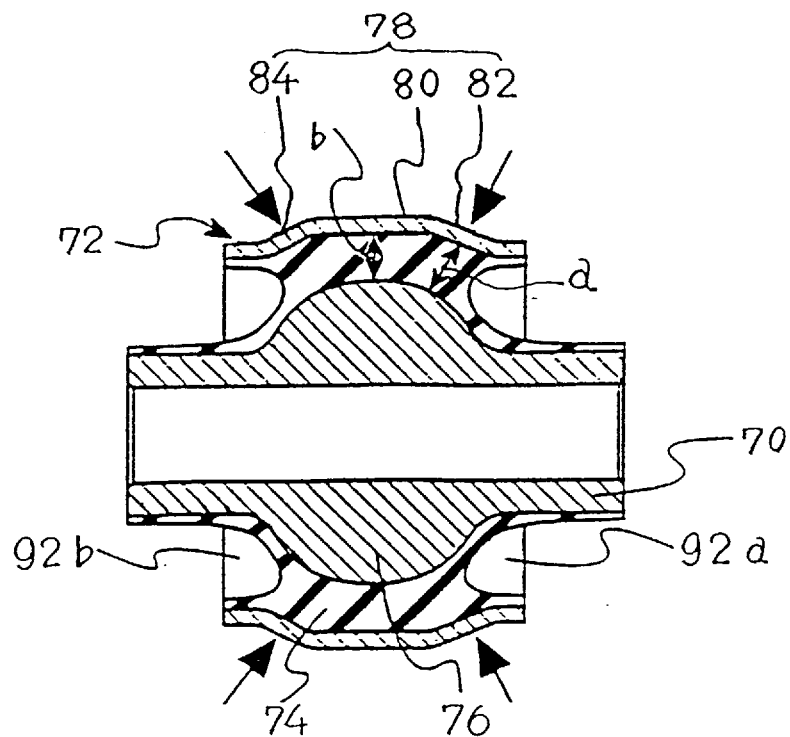
FIG. 14 is a view explaining a method for producing a suspension bushing in accordance with the present invention.
Figure 15:
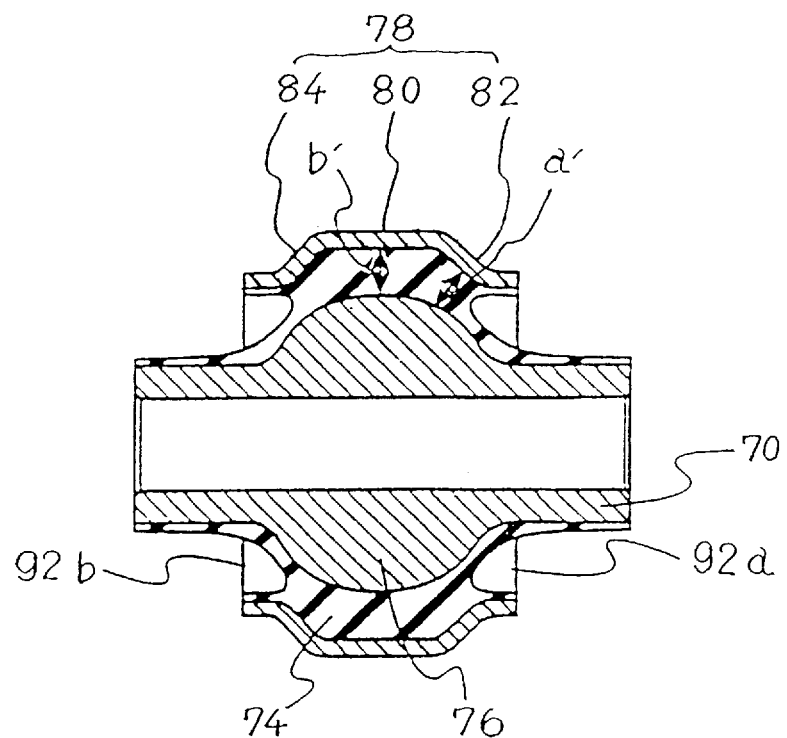
FIG. 15 is a longitudinal sectional view of a suspension bushing produced by the method of FIG. 14.

Next, to eliminate tensile stress occurred in the vibration-damping rubber member 74 due to injection molding, the outer cylindrical member 72 is entirely drawn with uniformity, and then, only the inclined side parts 82 and 84 are drawn further in the directions shown by the arrows in FIG. 14 into the finished configuration (FIG. 15). Since annular recesses 92a and 92b are formed in both axial end portions of the vibration-damping rubber member 74, compression thereof can be performed easily. This results in the thickness a' of the vibration-damping rubber member 74 between the inclined side parts 82 and 84 and the inner cylindrical member 70 becoming equal or less than the thickness b' of the vibration-damping rubber member 74 between the larger-diameter part 80 and the inner cylinder 70 (FIG. 15).

With the suspension bushing thus formed, the thickness of both the axial end portions of the vibration-damping rubber member 74 prior to drawing is large, which decreases strain occurring in rubber and increases the durability. Furthermore, the initial distance between the inner cylindrical member 70 and the outer cylindrical member 72 prior to drawing is large, which increases the size of the annular recesses 92a and 92b to ensure relief of stress concentration, and accordingly, further improvement of the durability.

By virtue of two stepped drawing operations, the vibration-damping rubber member 74 can be pre-compressed greatly in both axial end portions thereof, which enables both improvement of the durability and limitation of the displacement of rubber. Thus, as compared to that of the suspension bushing formed by the conventional methods, the rigidity in the directions perpendicular to the axial direction can be much increased, and accordingly, the spring characteristic can be greatly improved.

Figure 16:
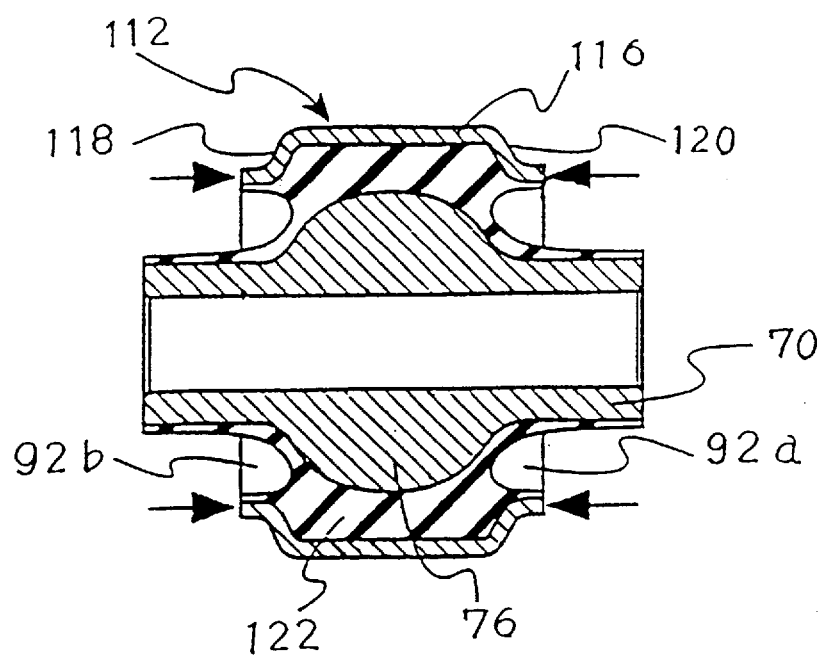
FIG. 16 is a view explaining another method for producing a suspension bushing in accordance with the present invention.

The suspension bushing illustrated in FIG. 13 can be produced by the following method. First, the side parts 118 and 120 of the outer cylindrical member 112 is inclined, as shown in FIG. 16, and the vibration-damping rubber member 122 is formed between the inner cylindrical member 70 and outer cylindrical member 112. Then, the inclined side parts 118 and 120 and both axial ends having a smaller diameter are drawn in the directions shown by the arrows in FIG. 16. With this method, operational advantages like those of the preceding embodiments can be ensured.

Figure 17:
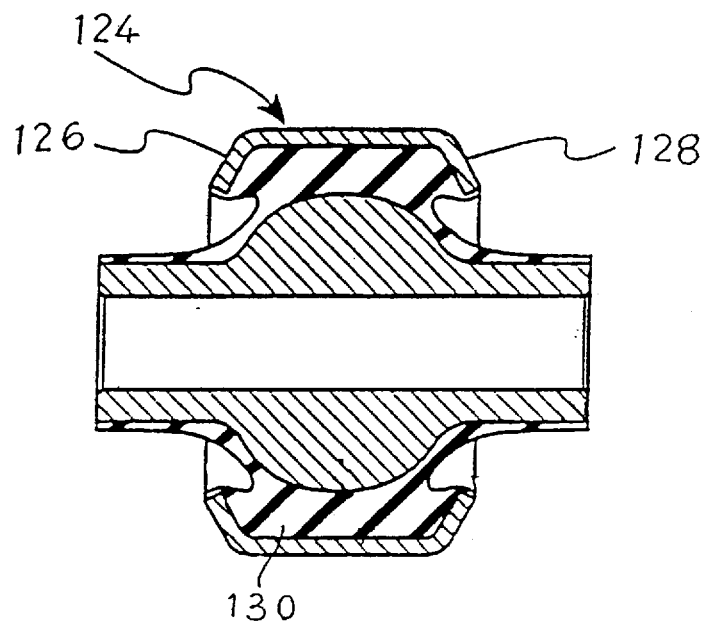
FIG. 17 is a longitudinal sectional view of another example of a suspension bushing to which the method of the present invention is adapted to be applied.
Figure 18:
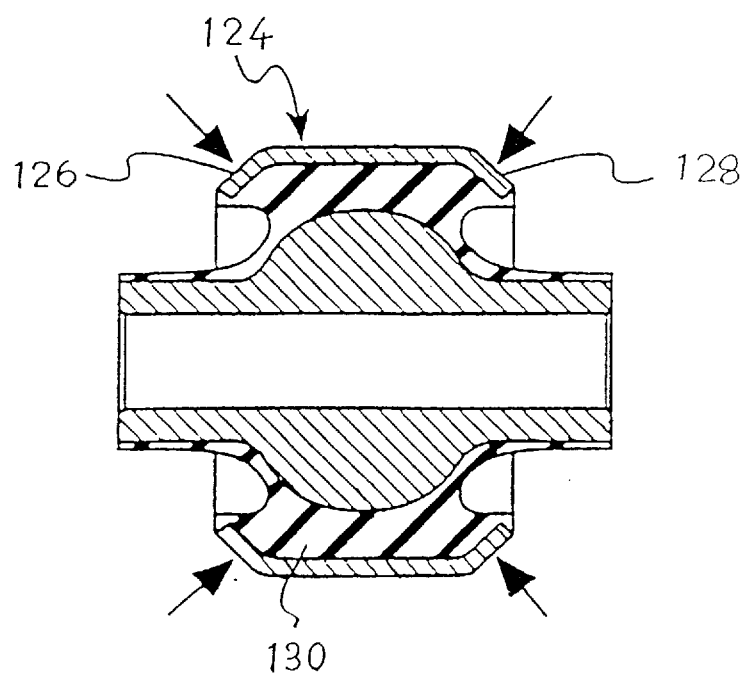
FIG. 18 is a view explaining the method for producing a suspension bushing shown in FIG. 17.

FIG. 17 and 18 illustrate another embodiment of the suspension bushing, to which the method in accordance with the present invention is applicable. As shown in FIG. 17, an outer cylindrical member 124 has no axial end corresponding to the axial ends 82 and 84 having a smaller diameter (FIG. 15). To form the suspension bushing thus arranged, similarly to the preceding methods, as shown in FIG. 18, the initial inclination angle of inclined side parts 126 and 128 of the outer cylindrical member 124 is made smaller than the finished inclination angle, and a vibration damping rubber body 130 is formed. Then, only the inclined side parts 126 and 128 are drawn in the directions shown by the arrows in FIG. 18. Since the outer cylindrical member 124 has a simple configuration, preparation and drawing of the outer cylindrical member 124 can be performed easily, thus enabling reduction of production costs.

Figure 19:
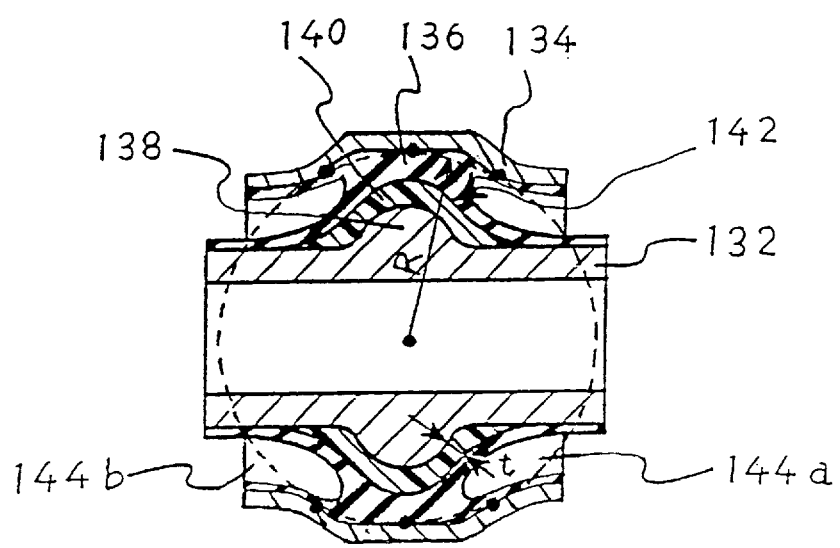
FIG. 19 is a longitudinal sectional view of a further embodiment of a suspension bushing in accordance with the present invention.

FIG. 19 illustrates still another embodiment of the present invention. As shown, a metallic inner cylindrical member 132 and a metallic outer cylindrical member 134 are disposed coaxially, and a vibration-damping rubber member 136 is formed between the inner cylindrical member 132 and outer cylindrical member 134.

Figure 20:
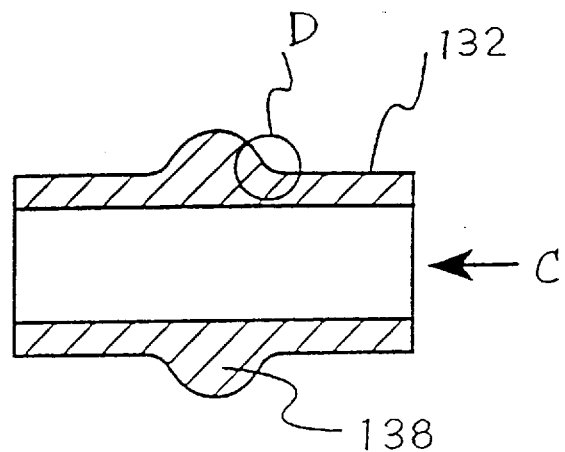
FIG. 20 is a longitudinal sectional view of an inner cylindrical member included in the embodiment of FIG. 19.

As shown in FIG. 20, the axially central portion of the inner cylindrical member 132 projects outwardly to define a convex portion 138 having a semicircular cross-section. As shown in FIG. 19, the convex portion 138 is entirely covered with a cover member 140 having a uniform thickness t, which is made of a resin material. Thus, an expanding portion 142 consisting of the convex portion 138 and cover member 140 is provided.

The outer cylindrical member 134 has a bending portion similar to the bending portion 78 of the outer cylindrical member 72 which is shown in FIG. 4.

To produce the suspension bushing thus arranged, the inner cylindrical member 132 having the convex portion 138 is placed in a first mold, a resin material is injected into the first mold to cover the convex portion 138 with the cover member 140, thus forming the expanding portion 142. The resin material injected thermally contracts to exert a binding force on the convex portion 138 to be joined thereto. As required, an adhesive agent may be used to join the resin material to the convex portion 138.

Next, an adhesive agent is applied to facing surfaces of the inner cylindrical member 132 and outer cylindrical member 134, and they are placed in a second mold coaxially. Then, a vibration-damping rubber member 136 is formed by injection molding. The vibration-damping rubber member 136 has in both axial end portions thereof annular recesses 144a and 144b of which inner ends locate inwardly of end edges of the expanding portion 142.

A large number of slight irregularities or grooves may be formed in a surface of the convex portion 138 of the inner cylindrical member 132 by blasting, knurling or the like. With this arrangement, the convex portion 138 has improved adhesion to the cover member 140.

Figure 21:
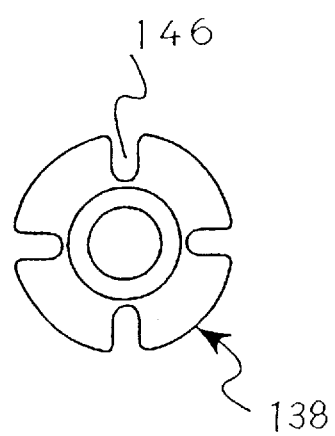
FIG. 21 is an end view illustrating an inner cylindrical member included in a still further embodiment of a suspension bushing in accordance with the present invention, which is taken in the direction of arrow C of FIG. 20.
Figure 22:
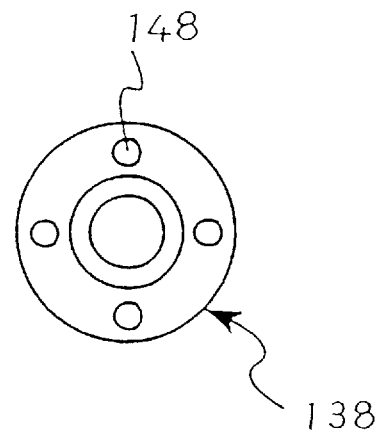
FIG. 22 is an end view illustrating an inner cylindrical member included in a still further embodiment of a suspension bushing in accordance with the present invention, which is taken in the direction of arrow C of FIG. 20.

Alternatively, as shown in FIG. 21, a plurality of slits 146 may be formed along the surface of the convex portion 138 in the aixal direction of the inner cylindrical member 132. This ensures smooth flow of the resin material, and accordingly, ensures improvement of the moldability of the cover member 140. Furthermore, the resin material filling the slits 146 restrains the relative rotation of the cover member 140 and convex portion 138 to improve strength thereof in the direction of rotation. In FIG. 21, four slits are provided in the convex portion 138. The number of slits is not limited to four. At least one slit will do. Alternatively, as shown in FIG. 22, a plurality of through-holes 148 may be provided in the convex portion 138.

Figure 23:
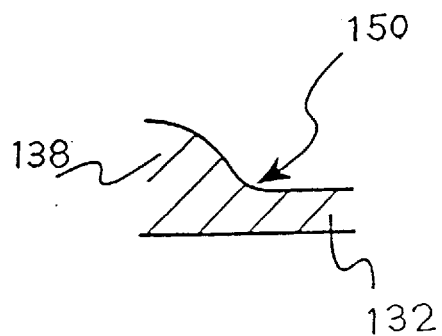
FIG. 23 is an enlarged view illustrating one part of an inner cylindrical member included in a still further embodiment of a suspension bushing in accordance with the present invention, which is enclosed within a circle D in FIG. 20.
Figure 24:
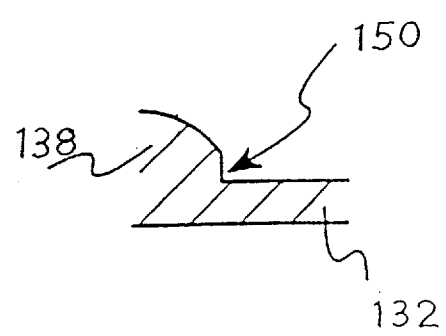
FIG. 24 is an enlarged view illustrating one part of an inner cylindrical member included in a still further embodiment of a suspension bushing in accordance with the present invention, which is enclosed within a circle D in FIG. 20.

The boundaries 150 between the convex portion 138 and axial end portions of the inner cylindrical member 132 may have a curved cross-section, as shown in FIG. 23, or a rectangular cross-section, as shown in FIG. 24. With the latter arrangement, the convex portion 138 has improved adhesion to the cover member 140, thus ensuring further improvement of the falling-off resistance.

Figure 1:
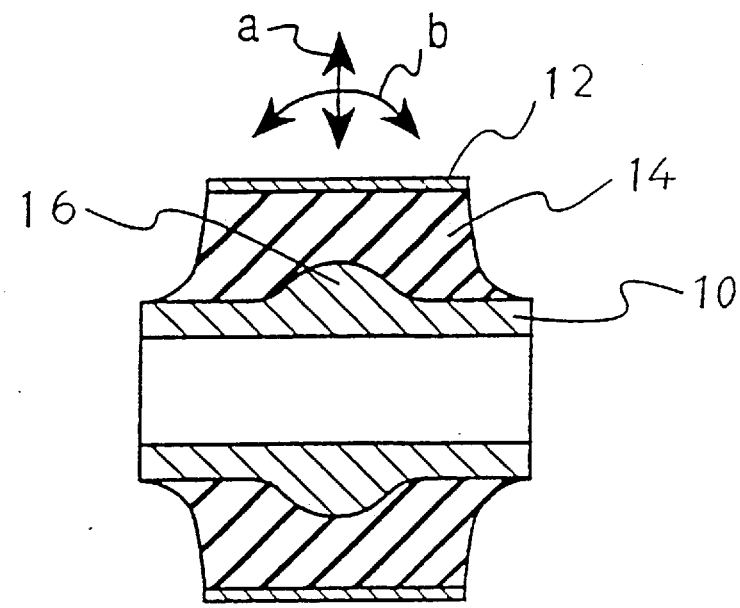
FIG. 1 is a longitudinal sectional view of a conventional suspension bushing.
Figure 2:
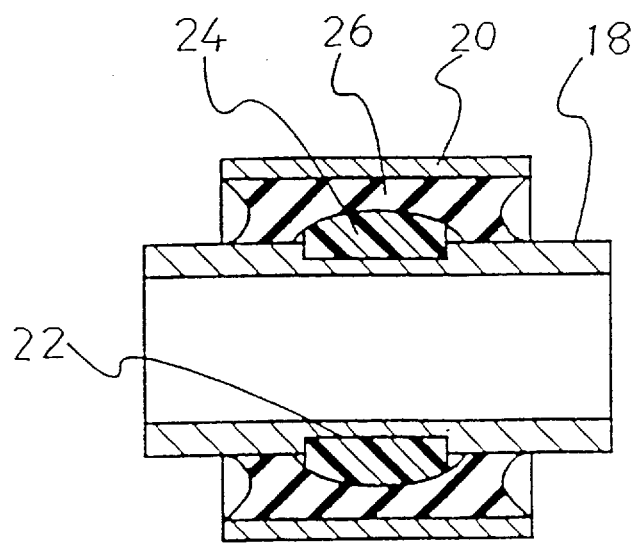
FIG. 2 is a longitudinal sectional view of another conventional suspension busing.

With the above arrangement, the operational advantages similar to those of the fifth embodiment of FIG. 7 can be effected. In addition, there is no need of providing such a depression as required with the conventional suspension bushing shown in FIG. 2, thus ensuring sufficient buckling strength. Furthermore, the thickness of the resin material defining the cover member 140 is approximately uniform, thus reducing shrinkage during molding, and ensuring improvement of the configuration accuracy, and accordingly, improvement of the performance. In addition, if the expanding portion 142 is high, the convex portion 138 limits the displacement or deformation of the expanding portion 142, thus reducing falling-off or cracking of the inner cylindrical member 132 due to input of a large load, and accordingly ensuring great improvement of the durability. The arrangement of the present embodiment that the expanding portion is defined by a convex portion of the inner cylindrical member and a resin cover member is applicable to preceding embodiments of the suspension bushing in accordance with the present invention other than the fifth embodiment of FIG. 7.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A suspension bushing comprising:

an inner cylindrical member having an expanding portion which expands outwardly from an entire outer periphery of an axially central portion thereof, said expanding portion having a generally spherical configuration of which a center locates about an axial line of said inner cylindrical member;

an outer cylindrical member disposed coaxially outside said inner cylindrical member;

an internal ring disposed in about the middle between said inner cylindrical member and said outer cylindrical member, an axially central portion of said internal ring bending in conformity with said expanding portion;

a first vibration-damping rubber member interposed between and joined to said internal ring and said inner cylindrical member; and a second vibration-damping rubber member interposed between and joined to said internal ring and said outer cylindrical member, said first vibration-damping rubber member and said second vibration-damping rubber member having annular recesses in axial end portions thereof, respectively, and an inner end of each annular recess locating inwardly of an end edge of said expanding portion.

2. A suspension bushing as claimed in claim 1, wherein an axially central portion of said outer cylindrical member bends in conformity with said expanding portion.

3. As suspension bushing comprising:

a cylindrical member having an expanding portion which expands outwardly from an entire outer periphery of an axially central portion thereof, said expanding portion having a spherical configuration of which a center locates about an axial line of said inner cylindrical member;

a vibration-damping rubber member having a predetermined thickness, which is joined to an outer periphery of said cylindrical member;

an internal ring which is embedded in said vibration-damping rubber member in about the middle thereof, an axially central portion of said cylindrical internal ring bending in conformity with said expanding portion, said vibration-damping rubber member having annular recesses in axial end portions thereof between said internal ring and said cylindrical member, an inner end of each annular recess locating inwardly of an end edge of said expanding portion, and said vibration-damping rubber member having a pair of flanges which project radially outwardly from axial ends thereof, and a bracket connected to a vibrating body being press-fitted unto an outer periphery of said vibration-damping rubber member between said flanges.

4. A suspension bushing as claimed in claim 3, wherein said internal ring has at least one annular reinforcing portion which extends radially outwardly from at least one axial end thereof and is embedded in at least one of said pair of flanges.

5. A suspension bushing comprising:

an inner cylindrical member having an expanding portion which expands outwardly from an entire outer periphery of an axially central portion thereof, said expanding portion having a generally spherical configuration of which a center locates about an axial line of said inner cylindrical member;

an outer cylindrical member disposed coaxially outside said inner cylindrical member, an axially central portion of said outer cylindrical member bending in conformity with said expanding part to define a bending portion, and said bending portion including at an axial center thereof a larger-diameter part having a uniform larger diameter, which is adapted to abut an inner surface of a cylindrical bracket disposed outside said outer cylindrical member;

a vibration-damping rubber member interposed between and joined to said inner cylindrical member and said outer cylindrical member, said vibration-damping rubber member having annular recesses in axial end portions thereof, and an inner end of each annular recess locating inwardly of an end edge of said expanding portion.

6. A suspension bushing as claimed in claim 5, wherein said bending portion of said outer cylindrical member is connected to axial ends thereof in a curved surface, respectively.

7. A suspension bushing as claimed in claim 5, wherein axial end portions of said vibration-damping rubber member, which define said annular recesses on one side of said inner cylindrical member and said outer cylindrical member, have a large thickness to define stopper means.

8. A method for producing a suspension bushing including an inner cylindrical member having an expanding portion with a generally spherical configuration, an outer cylindrical member disposed coaxially outside said inner cylindrical member and having a bending portion which conforms with said expanding portion, and a vibration-damping rubber member joined to said inner cylindrical member and said outer cylindrical member and having annular recesses in both axial end portions thereof, comprising the steps of:

forming said outer cylindrical member into a configuration having a larger-diameter part of a uniform larger diameter, which is adapted to face a top of said expanding portion of said inner cylindrical member, and side parts, each of which extends from an axial end of said larger-diameter part to an axial end of said outer cylindrical member such that the diameter thereof gradually decreases towards said axial end of said outer cylindrical member with an inclination angle smaller than a predetermined finished inclination angle;

joining a vibration-damping rubber member which defines annular recesses in both axially end portions thereof to said inner cylindrical member and said outer cylindrical member such that the thickness between said both axially end portions and said inner cylindrical member is greater than a predetermined finished thickness; and deforming said side parts of said outer cylindrical member into a predetermined finished configuration.

9. A method for producing a suspension bushing as claimed in claim 8, wherein said deforming step is performed by reducing a diameter of said outer cylindrical member uniformly, and deforming only said side parts into said predetermined finished configuration.

10. A suspension bushing as claimed in claim 1, wherein said expanding portion includes a convex portion which is formed integrally with an axially central portion of said inner cylindrical member along an entire outer periphery thereof so as to have a height smaller than that of said expanding portion, and a cover member made of a resin material and having a uniform thickness, which covers an entire surface of said convex portion.

11. A suspension bushing as claimed in claim 10, wherein a large number of one of slight irregularities and grooves are formed in a surface of said convex portion.

12. A suspension bushing as claimed in claim 10, wherein a plurality of one of slits and through-holes are formed in a surface of said convex portion.

13. A suspension bushing as claimed in claim 3, wherein said expanding portion includes a convex portion which is formed integrally with an axially central portion of said inner cylindrical member along an entire outer periphery thereof so as to have a height smaller than that of said expanding portion, and a cover member made of a resin material and having a uniform thickness, which covers an entire surface of said convex portion.

14. A suspension bushing as claimed in claim 13, wherein a large number of one of slight irregularities and grooves are formed in a surface of said convex portion.

15. A suspension bushing as claimed in claim 13, wherein a plurality of one of slits and through-holes are formed in a surface of said convex portion.

16. A suspension bushing as claimed in claim 5, wherein said expanding portion includes a convex portion which is formed integrally with an axially central portion of said inner cylindrical member along an entire outer periphery thereof so as to have a height smaller than that of said expanding portion, and a cover member made of a resin material and having a uniform thickness, which covers an entire surface of said convex portion.

17. A suspension bushing as claimed in claim 16, wherein a large number of one of slight irregularities and grooves are formed in a surface of said convex portion.

18. A suspension bushing as claimed in claim 16, wherein a plurality of one of slits and through-holes are formed in a surface of said convex portion.

* * * * *